United States Patent [19]
Jaeger

[11] 3,735,121
[45] May 22, 1973

[54] HEADLAMP BEARING

[75] Inventor: Joseph H. Jaeger, Indianapolis, Ind.

[73] Assignee: Illinois Tool Works Inc., Chicago, Ill.

[22] Filed: Oct. 12, 1971

[21] Appl. No.: 188,047

[52] U.S. Cl. ................................. 240/41.6, 287/21
[51] Int. Cl. ................................................. F21v 7/00
[58] Field of Search ................... 240/41 BM, 41 SC, 240/41 L, 41.6; 285/263; 287/12, 21

[56] References Cited

UNITED STATES PATENTS

| | | | |
|---|---|---|---|
| 1,932,265 | 10/1933 | Douglas | 240/41 L |
| 3,062,489 | 11/1962 | Zook | 240/41.6 X |
| 3,493,740 | 2/1970 | Onksen | 240/41.6 |

Primary Examiner—Fred L. Braun
Attorney—Robert W. Beart, Jack R. Halvorsen and Thomas W. Buckman

[57] ABSTRACT

A bearing element having a relatively thin, flat plate-like body and leg-like members extending from the apices of the body. Each of the leg members having convexly curved bearing surfaces, the legs and bearing surfaces adapted to be positioned between a headlamp housing and a mounting ring of the ball-and-socket type to provide ease of adjustment of said housing relative to said ring. The flat body portion includes retaining elements for mounting the body relative to the housing in assembled relationship.

9 Claims, 4 Drawing Figures

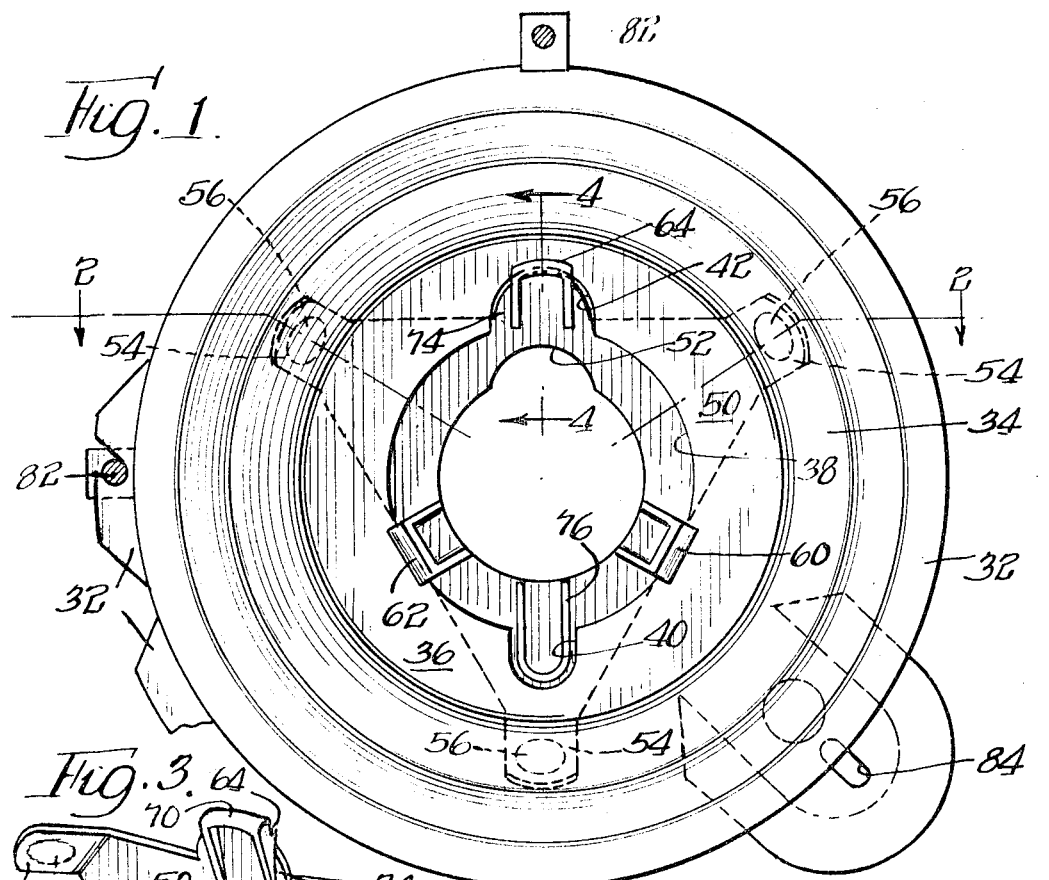
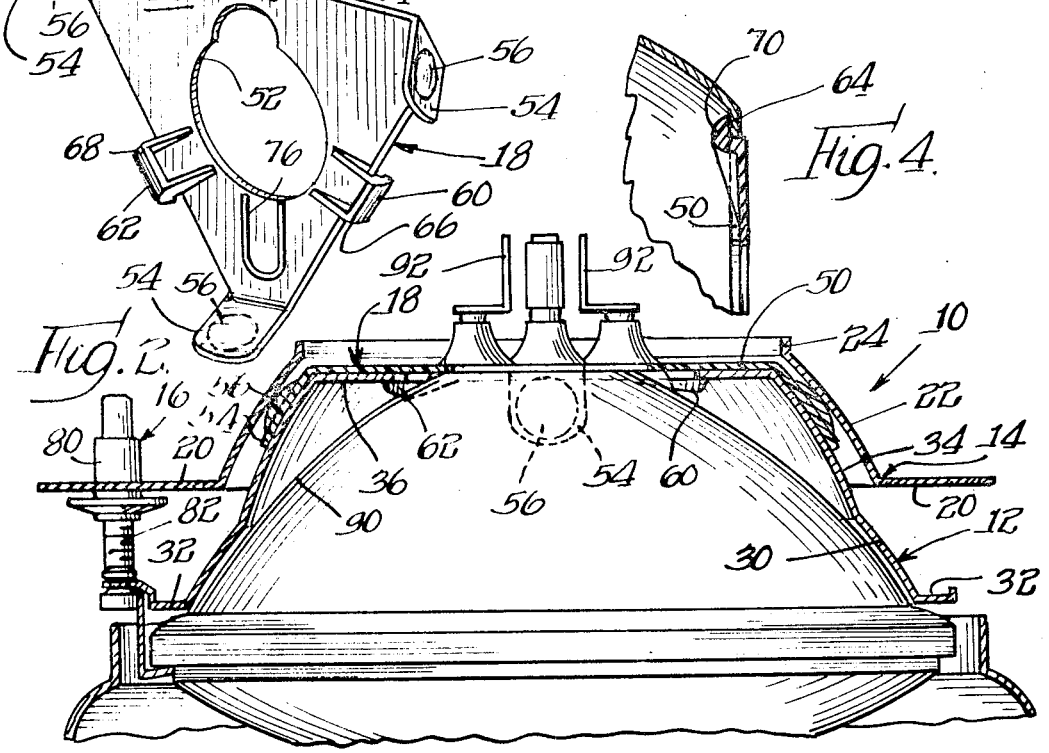

HEADLAMP BEARING

BACKGROUND OF THE INVENTION

This invention relates to the mounting of sealed beam headlamps. In the mounting of sealed beam headlamps on automobiles, it is conventional to utilize a ball-and-socket type including a housing having a spherical segment which is positioned within a complimentary mounting ring. Generally the mounting ring is a fixed bracket on the automobile while the housing, which has the headlamp fixed relative thereto is adjustable relative to the fixed bracket and utilizes a three-point adjustment, one of the three points is generally a spring biased means while the other two points utilize screw members to react against the spring bias and to maintain the housing in an adjustively fixed relation relative to the mounting ring.

In those instances where the housing and mounting ring are fabricated from a metal it is necessary to coat these members against corrosion. Often, the corrosion material being painted, there is a tendency for the housing and mounting ring to sieze and become locked due to cohesion between the painted surfaces of the housing and mounting ring. It is an object of this invention to provide a bearing member which can be interposed between the housing and mounting ring to permit ease of adjustment under substantially all conditions.

SUMMARY

As disclosed herein, a headlamp assembly of the ball-and-socket type is mounted on an automobile with a housing generally cup shaped in configuration and having a spherical segment at the lower end of the housing is adapted to be accepted within the complimentary portion of a mounting ring fixed relative to the automobile, said housing must be adjustable relative to the automobile to permit adjustment of the headlamp. The housing includes a flange from the open end of the cup shaped body and is provided with means for accepting the spring and screws which are utilized in the adjustment process. The cup shaped body portion of the housing has an apertured, flat plate-like base, the aperture serving to accept the electrical connection to the sealed beamed headlamp positioned within the housing. In accordance with the teachings of this invention a one-piece, thin, flat plastic body generally triangular in shape is positioned in said flat base of the housing and has extending angularly and outwardly from said flat body with the legs being adapted to embrace the spherical segment portion of the cup shaped body portion. Laterally extending shoulder means are disposed between adjacent pairs of the legs and extend from the flat portion and are adapted to pass through the aperture in the base of the cup shaped body portion and engage the surface opposite that engaged by the flat, plate-like body. Anti-rotation means are also provided to maintain a stable relationship between the housing and the bearing member. Convexly curved protuberance means extend radially outwardly from the surface of the base, opposite to the plate-like body portion, to provide limited bearing surfaces adapted to engage the mounting ring. When the bearing member is made of a lubricious plastic material the housing can be readily adjusted relative to the mounting ring and seizure between the housing and mounting ring is eliminated.

DESCRIPTION OF THE DRAWINGS

FIG. 1 is a plan view showing the bearing means of this invention in mounted position on a housing;

FIG. 2 is a side elevation taken along lines 2—2 of FIG. 1;

FIG. 3 is a perspective view of a bearing member of the type contemplated by the present invention; and FIG. 4 is a sectional view of the retaining means of this invention as viewed along lines 4—4 of FIG. 1.

DESCRIPTION

Referring now to the drawing wherein similar numerals are utilized to designate similar parts; a headlamp assembly can, embodying the present invention, include a housing 12, a mounting ring 14, adjustment means 16 and a bearing member 18.

As is well known in the art a fixed bracket 20 is mounted on the automobile and has stamped in there a mounting ring 22 which generally defines a spherical segment 22 terminating in an axially extending flange 24. Positioned within mounting ring 22 is a housing 12 having a cup shaped body portion 30 with an annular flange 32 extending laterally from the open end thereof. The lower extremity of the cup shaped body is a spherical segment 34 generally complimentary to the mounting ring segment 22 and terminates in a flat base 36 having a center aperture of 38. Aperture 38, in this embodiment of the invention, is provided with a pair of laterally extending slots 40 and 42 which communicate with the aperture 38, for purposes best set forth hereinafter.

Due to the presence of possible siezing between the housing 30 and mounting ring 14, there is interposed therebetween a bearing member 18. The bearing member 18 includes a flat plate-like body portion 50 which is quite thin. Preferably the body is generally triangular in configuration and has a central aperture 52. Aperture 52 may have any desired configuration suitable to accept the electrical connections for a headlamp. At each of the corners or apices of the plate-like portion 50 there is provided a thin leg 54 which extends angularly and upwardly from the flat plate-like portion 50. Each of the legs 54 carries a convexly curved protuberance 56. The plate-like body portion 50 is adapted to be seated against the base 36 and is of such dimension that the legs 54 will embrace the spherical segment 34 for a substantial portion of its extent with the button-like convex protuberances 56 serving as a limited bearing means against the spherical segment 22 of the mounting ring 14. retaining means are provided for assembly of the bearing 18 with the base aperture 38. These retaining means take the form of rigid stepped shoulders, 60, 62 and 64 which extend laterally from the flat plate-like portion 50 and are adapted to underly the opposite surface of base 36 from the surface contacted by the plate-like portion 50. Each of the shoulder means is provided with a cam surface designated by the numerals 66, 68 and 70 respectively. The cam surfaces assist in the assembly of the plate-like portion 50 to the base and the plate-like portion 50 is thin enough to be resiliently flexed to permit the association of the shoulders with the underside of the surface adjacent the aperture 38. Generally the device is assembled to the housing by depressing the plate-like member 50 and sliding shoulders 60 and 62 into engagement and then flexing one edge of portion 50 upwardly to insert the shoulder 64 in mounted position. Adjacent to the rigid shoulder 64 is a semi-circular planar element 74 which is complimentary in configuration to the slot 42. Generally opposite to the planar element 74 is an axially raised rib 76 which is complementary in configuration to the slot 40 and serves as a locating means during the mounting of the shoulders 60 and 62. The rib 76 in combination with the planar element 74 serves as an anti-rotation means so that the bearing surfaces 56 do not move relative to the housing 12.

The bearing member 18 is generally a one-piece plastic device which can be fabricated from any suitable lubricious plastic material such as nylon or glass-filled polypropylene, although other materials will be readily apparent to those skilled in the art. To assemble a ball-and-socket type assembly of the type described, the adjustment means 16 including a nut element 80 and a grooved screw 82 are assembled to the rigid mounting 20; the bearing member 18 is assembled to the housing 12 and the housing is then telescopically associated with the bearing member 18 being interposed between the spherical segments 22 and 34. The flange 32 is provided with slots for engagement with the screw 82 and a spring element for biasing the housing against the screws 82, said spring element not being shown, is affixed between the rigid housing 20 and an appropriate portion of the flange 32 at a point designated by the numeral 84. The sealed beam headlamp 90 with the electrical connections 92 is axially telescoped within the housing with the connections 92 protruding and extending through the apertures 52 and 38 in the housing and bearing member. The screws 82 are then adjusted to direct the beam in the desired direction.

Thus, it can be seen that there has been provided a mounting for headlamp which utilizes a minimum number of parts and which can be manufactured at low-cost while eliminating the problem of siezing between the housing and mounting ring through the use of the present invention relating to a bearing member. The efficiency with which the bearing member can be assembled to the housing to provide multiple point contacts provides a economical assembly resulting in a device capable of being adjusted with ease.

I claim:

1. A one-piece, thin, lubricious plastic bearing member adapted to be positioned between two relatively movable truncated spherical segments and having a generally planar triangularly shaped body adapted to intimately engage one side of the truncated end surface of one of said segments, three thin leg members extending angularly outwardly from the apices of said body, and adapted to embrace the spherical portion of said segment adjacent said truncated end surface, shoulder means extending outwardly from said body and adapted to engage the opposite side of said truncated end surface of said one segment to mount said bearing member in fixed relation to said one segment, each of said legs carrying convexly curved bearing surfaces extending outwardly away from the direction of said body and adapted to slidingly engage the interior surface of said other spherical segment.

2. In a headlamp assembly of the ball-and-socket type including a housing having an annular flange laterally extending from one end of a cup shaped body portion, said body portion having a spherical segment terminating at its end opposite said flange in an apertured base extending radially inwardly from said body portion, a mounting ring having a complimentary portion adapted to matingly accept said spherical segment in an adjustable manner, and lubricious bearing means including an apertured plate-like portion, means for retaining said plate-like portion in juxtaposed mounted relation to one surface of said base, means for preventing rotation between said plate-like portion and said base, and three leg members extending angularly away from the plane of said plate-like portion embracing said spherical segment and carrying protuberance means adapted to be positioned between said housing and said ring to form a bearing surface between the housing and ring to permit ease of adjustment of said housing relative to said ring.

3. An assembly of the type claimed in claim 1 wherein said aperture in said base includes at least one laterally extending slot for engagement by said retaining means and said rotation preventing means.

4. An assembly of the type claimed in claim 3 wherein said means for preventing rotation includes rib means carried by said plate-like portion for rotation preventing engagement with said at least one laterally extending slot.

5. A device of the type claimed in claim 2 wherein said plate-like portion has a generally thin, planar, and triangular configuration, said leg members each extending outwardly from an apex of said triangular configuration.

6. An assembly of the type claimed in claim 1 wherein said retaining means includes at least two stepped shoulder means extending laterally from the margin of said plate-like portion and adapted to extend through the aperture in said base and engage the opposite surface of said base.

7. A device of the type claimed in claim 2 wherein said legs are thin members adapted to have one side lie flat against said spherical segment and said protuberance means extending outwardly from the opposite side of each leg having a curved button bearing surface resting against said ring.

8. An assembly of the type claimed in claim 1 wherein said housing base aperture is generally circular in configuration and includes a pair of generally oppositely extending slot means communicating with said aperture, said bearing means plate-like portion being a thin, planar, triangularly shaped element with the three legs extending generally from the apices thereof, each leg being relatively thin and adapted to embrace said spherical segment, said protuberance being convex toward said ring and providing a bearing surface of limited contact, said retaining means including at least two stepped shoulder members extending both axially and laterally from said plate-like portion and adapted to engage the opposite surface of said base, and axially extending means adapted to engage the edges of one of said slots to serve as said anti-rotation means.

9. An assembly of the type claimed in claim 8 wherein there are three stepped shoulder members each positioned intermediate a pair of legs, one of said shoulder members being positioned within one of said slots while said other two shoulder members engage the edge of said aperture and said axially extending means being in the form of a rib having a configuration adapted to engage the edges of said other slot to assist in the prevention of rotation relative to said base.

* * * * *